United States Patent
Wolff-Petersen et al.

(10) Patent No.: US 9,975,048 B2
(45) Date of Patent: *May 22, 2018

(54) APPARATUS AND METHOD FOR ENHANCING A CONDITION IN A GAMING APPLICATION

(71) Applicant: STEELSERIES APS, Frederiksberg (DE)

(72) Inventors: Jacob Wolff-Petersen, Copenhagen (DE); Tino Soelberg, Valby (DK)

(73) Assignee: STEELSERIES ApS, Frederiksberg (DK)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/156,500

(22) Filed: May 17, 2016

(65) Prior Publication Data

US 2016/0332078 A1 Nov. 17, 2016

Related U.S. Application Data

(63) Continuation of application No. 12/558,230, filed on Sep. 11, 2009, now Pat. No. 9,364,750.

(51) Int. Cl.
| | | |
|---|---|---|
| *A63F 13/54* | (2014.01) | |
| *A63F 13/25* | (2014.01) | |
| *A63F 13/20* | (2014.01) | |
| *A63F 13/40* | (2014.01) | |
| *A63F 13/63* | (2014.01) | |

(52) U.S. Cl.
CPC ............. *A63F 13/54* (2014.09); *A63F 13/10* (2013.01); *A63F 13/20* (2014.09); *A63F 13/25* (2014.09); *A63F 13/63* (2014.09); *A63F 2300/209* (2013.01); *A63F 2300/6009* (2013.01); *A63F 2300/6081* (2013.01)

(58) Field of Classification Search
CPC ................ G06F 3/165; G06F 3/04815; G10H 2210/301; A63F 13/10; A63F 2300/6081; A63F 13/54; A63F 2300/6063; A63F 2300/6072

See application file for complete search history.

(56) References Cited

U.S. PATENT DOCUMENTS

| | | |
|---|---|---|
| 6,960,137 B2 | 11/2005 | Nishizawa |
| 7,027,600 B1 | 4/2006 | Kaji |
| 8,184,824 B2 | 5/2012 | Hettinger |

(Continued)

FOREIGN PATENT DOCUMENTS

WO     2007102805     9/2007

OTHER PUBLICATIONS

"AFK System", IGG, Jun. 4, 2014.

(Continued)

*Primary Examiner* — Werner Garner
(74) *Attorney, Agent, or Firm* — Guntin & Gust, PLC; David Terrell

(57) ABSTRACT

A system that incorporates teachings of the present disclosure may include, for example, a gaming console having a controller to receive a request to decrease or increase at least one of a plurality of sounds generated by a gaming application to enhance at least one condition in the gaming application, and modify sound produced by the gaming application according to the request. Additional embodiments are disclosed.

20 Claims, 9 Drawing Sheets

(56) References Cited

U.S. PATENT DOCUMENTS

| | | |
|---|---|---|
| 2002/0094866 A1 | 7/2002 | Takeda |
| 2007/0173326 A1 | 7/2007 | Jennings et al. |
| 2008/0234049 A1 | 9/2008 | LeBlanc et al. |
| 2009/0318223 A1 | 12/2009 | Langridge |
| 2010/0241959 A1* | 9/2010 | Ng .................. G06F 3/165 715/716 |
| 2011/0019839 A1 | 1/2011 | Nandury |

OTHER PUBLICATIONS

Cole, "Using a Genetic Algorithm to Tune First-Person Shooter Bots", 2004, IEEE.

Zetterstrom, "A Legal Analysis of Cheating in Online Multiplayer Games", Mar. 2005, School of Economics and Commercial Law, Goteborg University.

* cited by examiner

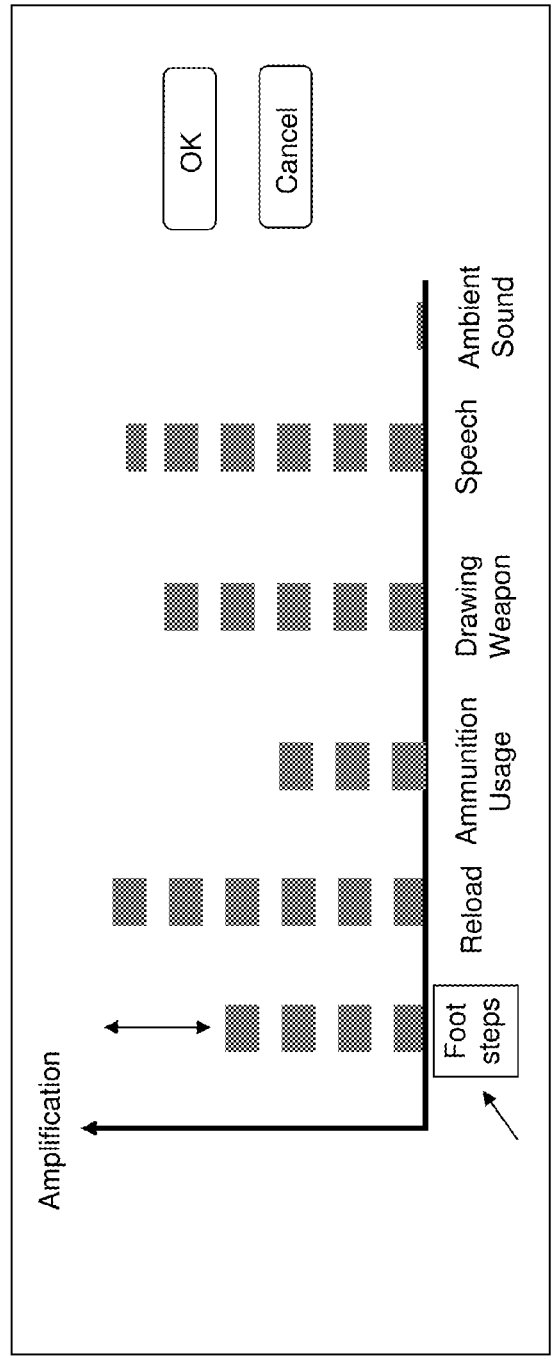

| Key | Time | Key presses |
|---|---|---|
| → | 04:16:15 | 493 |
| ← | 04:33:16 | 479 |
| ↓ | 03:52:39 | 455 |
| ↑ | 03:32:11 | 403 |
| Alt . | 00:02:16 | 311 |
| Ctrl A | 00:01:22 | 265 |
| F7 | 00:00:2 | 1 |

Usage Suggestions

- Consider replacing <Alt .> with a macro triggered by <Ctrl F> to improve response time and free the user's right hand for other tasks. The "Ctrl" key on the left side of the keyboard can be held down while the user's fingers toggle between the "A" and "F" keys.

- Alternatively, consider creating single button macros for <Ctrl A> and <Alt .> which can be assigned to keys on the keyboard or left-right buttons on a mouse.

FIG. 3

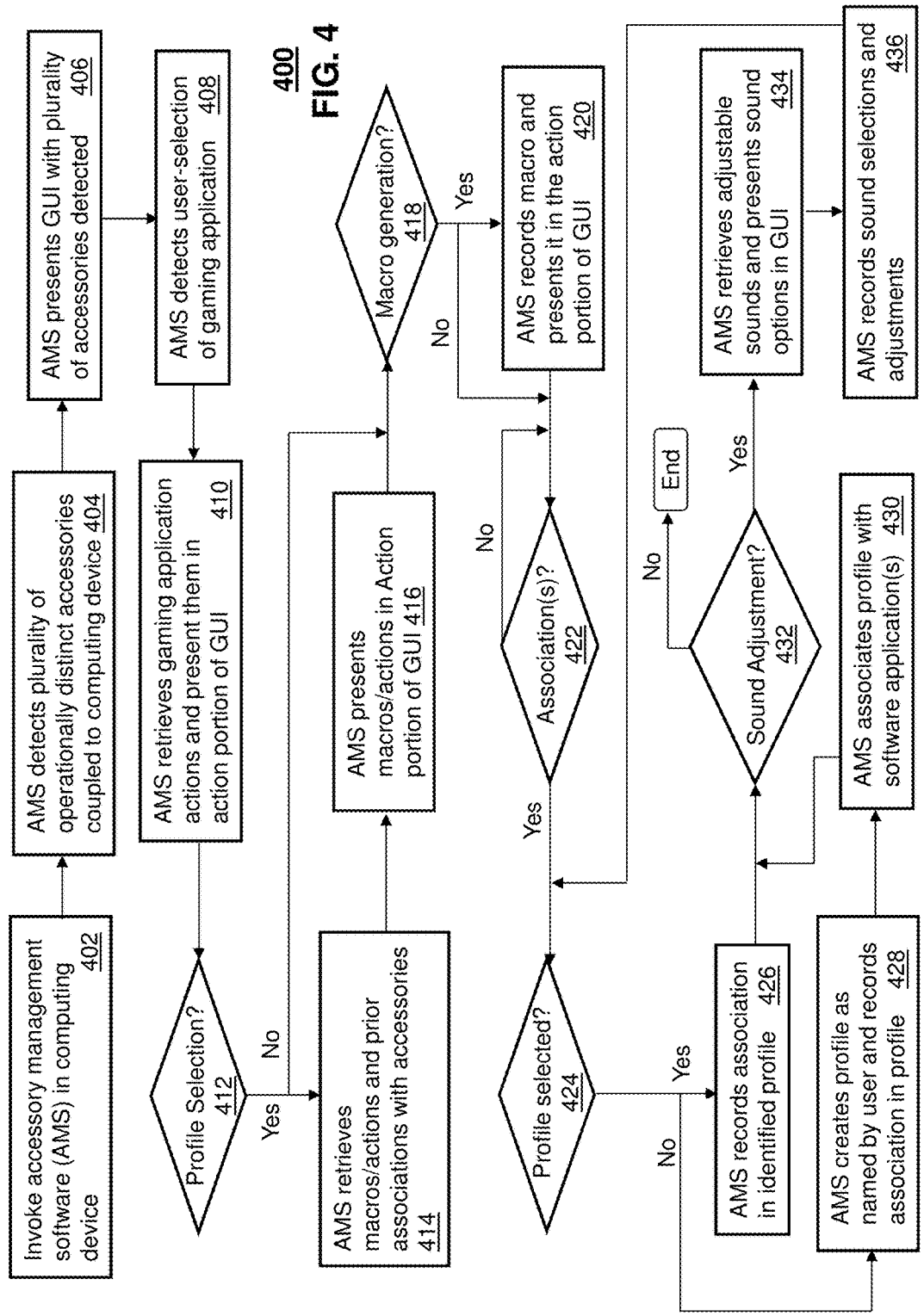

US 9,975,048 B2

APPARATUS AND METHOD FOR ENHANCING A CONDITION IN A GAMING APPLICATION

CROSS-REFERENCE TO RELATED APPLICATIONS

This application is a Continuation of and claims priority to U.S. patent application Ser. No. 12/558,230 filed Sep. 11, 2009. The contents of each of the foregoing are hereby incorporated by reference into this application as if set forth herein in full.

FIELD OF THE DISCLOSURE

The present disclosure relates generally to gaming applications, and more specifically to an apparatus and method for enhancing a condition in a gaming application.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to communicate with other players, a joystick, a computer display, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to users.

BRIEF DESCRIPTION OF THE DRAWINGS

FIGS. 1A, 1B, 1C, 2, and 3 depict illustrative embodiments of a Graphical User Interface (GUI) generated by an Accessory Management Software (AMS) application according to the present disclosure;

FIGS. 4-6 depict illustrative methods describing the operation of the AMS application;

DETAILED DESCRIPTION

One embodiment of the present disclosure entails a computer-readable storage medium having computer instructions to receive a selection of at least one of a plurality of sounds generated by a gaming application, receive a request to reduce or augment the selected at least one sound to enhance at least one tactical condition associated with the gaming application, modify sound produced by the gaming application according to the request and the selected at least one sound, and present the modified sound.

One embodiment of the present disclosure entails a gaming console having a controller to receive a request to decrease or increase at least one of a plurality of sounds generated by a gaming application to enhance at least one condition in the gaming application, and modify sound produced by the gaming application according to the request.

One embodiment of the present disclosure entails a method to modify sound produced by a gaming application responsive to a request to reduce or augment at least one of a plurality of sounds generated by the gaming application to enhance at least one condition associated with the gaming application FIGS. 1A-1C and 2-3 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, or a gaming console. A gaming console can represent a gaming device such as a Playstation 3™, a Wii™, or an Xbox360™. Other present and next generation gaming consoles are contemplated. The AMS application can also operate in other computing devices with less computing resources such as a cellular phone, a personal digital assistant, or a media player (such as an iPOD™). From these illustrations it would be apparent to an artisan with ordinary skill in the art that the AMS application can operate in any device with computing resources.

Figure 5:
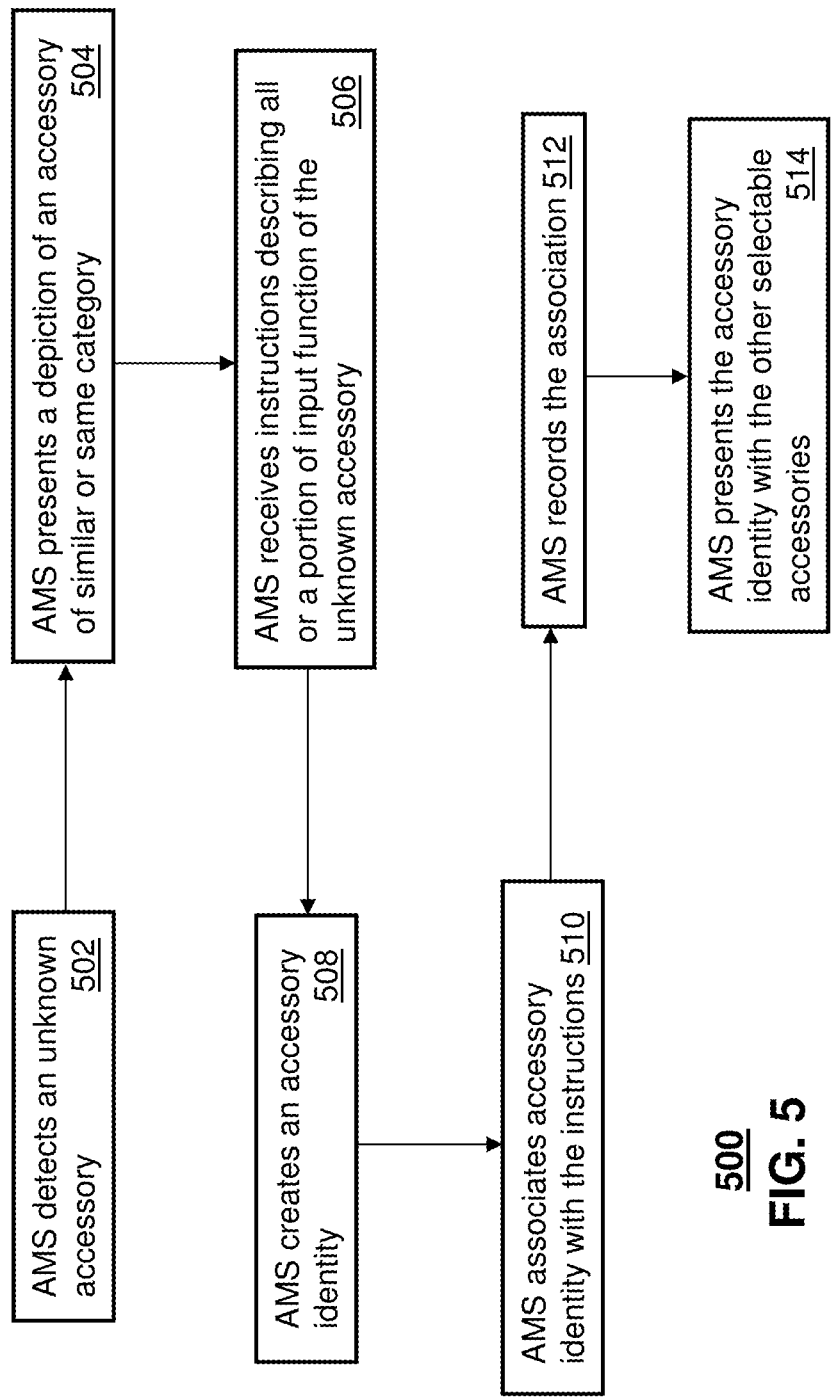
Figure 6:
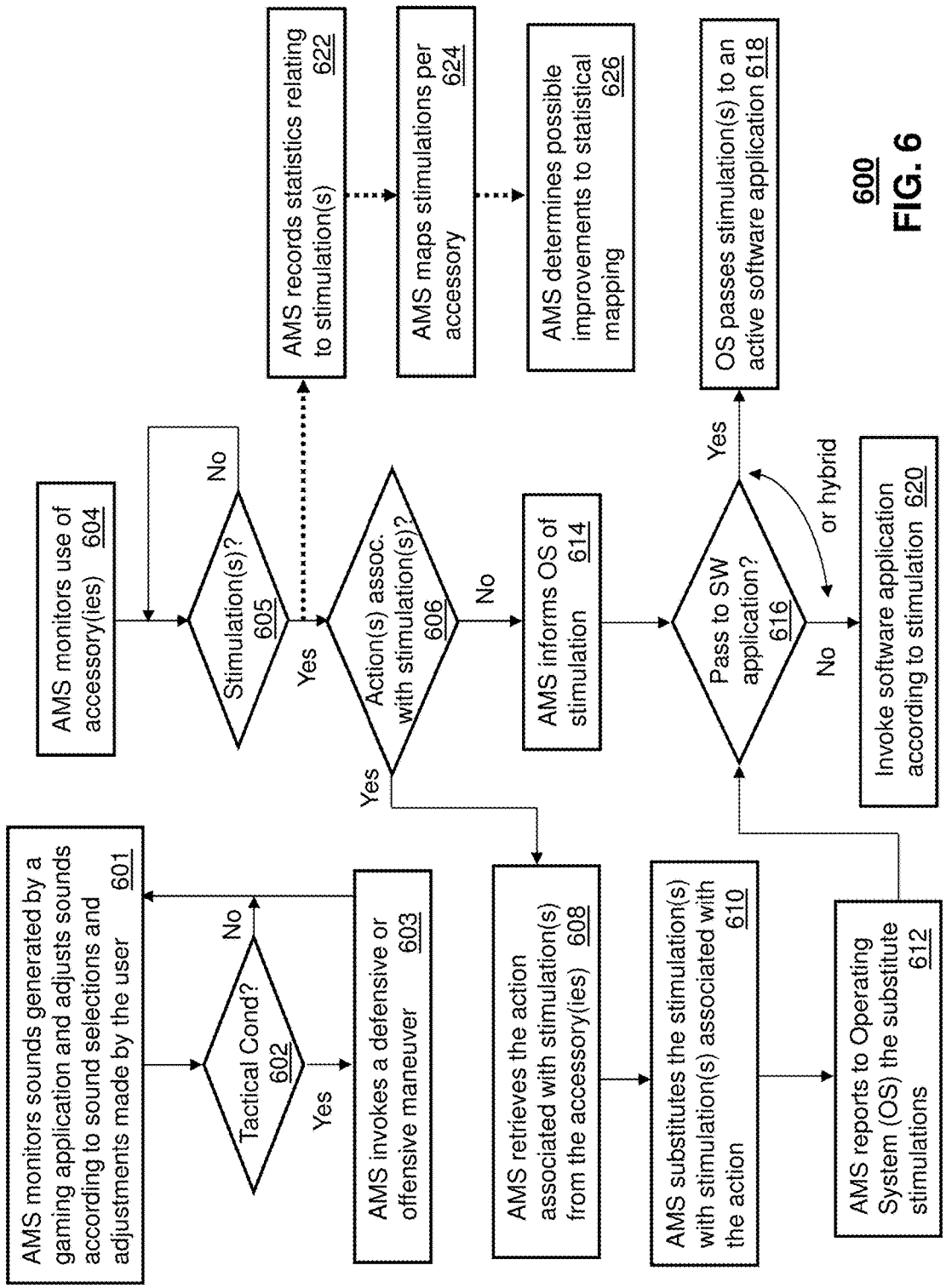

FIGS. 4-6 depict illustrative methods 400-600 describing the operation of the AMS application as shown in FIGS. 1-3. Method 400 can begin with step 402 in which the AMS application is invoked in a computing device. The invocation step can result from a user selection of the AMS application from a menu or iconic symbol presented on a desktop of the computing device by an operating system (OS) managing operations thereof. In step 404, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks, game controllers or any other input devices represent additional categories of accessories supported by the AMS.

In step 406, the AMS application can present a GUI 101 such as depicted in FIG. 1 with operationally distinct accessories such as the keyboard 108 and mouse 110. The GUI 101 presents the accessories 108-116 in a scrollable section 117. One or more accessories can be selected by a user with a common mouse pointer. In this illustration, the keyboard 108 and mouse 110 were selected with a mouse pointer for customization. Upon selecting the keyboard 108 and mouse 110 in section 117, the AMS application presents the keyboard 108 and mouse 110 in split windows 118, 120, respectively, to help the user during the customization process.

In step 408, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or mouse 110 to make an association with an input function of one of these accessories.

For example, the user can drag the Melee Attack symbol to the right mouse button thereby causing an association between the selection of the right mouse button and the gaming action of a Melee Attack. When the right button of the mouse 110 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing. Once the macro has been fully defined, selection of button 154 records the macro in step 420. The recording step can be combined with a step for adding the macro to the associable items Actions column 130, thereby providing the user the means to associate the macro with input functions of the accessories.

In step 422, the AMS application can respond to drag and drop associations between actions and input functions of the keyboard 108 and the mouse 110. If an association is detected, the AMS application can proceed to step 424 where it can determine if a profile has been identified in step 412 to record the association(s) detected. If a profile has been identified, the associations are recorded in said profile in step 426. If a profile has not been identified in step 412, the AMS application can create a profile in step 428 for recording the detected associations. In the same step, the user can name the newly created profile as desired. The newly created profile can also be associated with one or more software applications in step 430 for future reference.

Figure 1A:
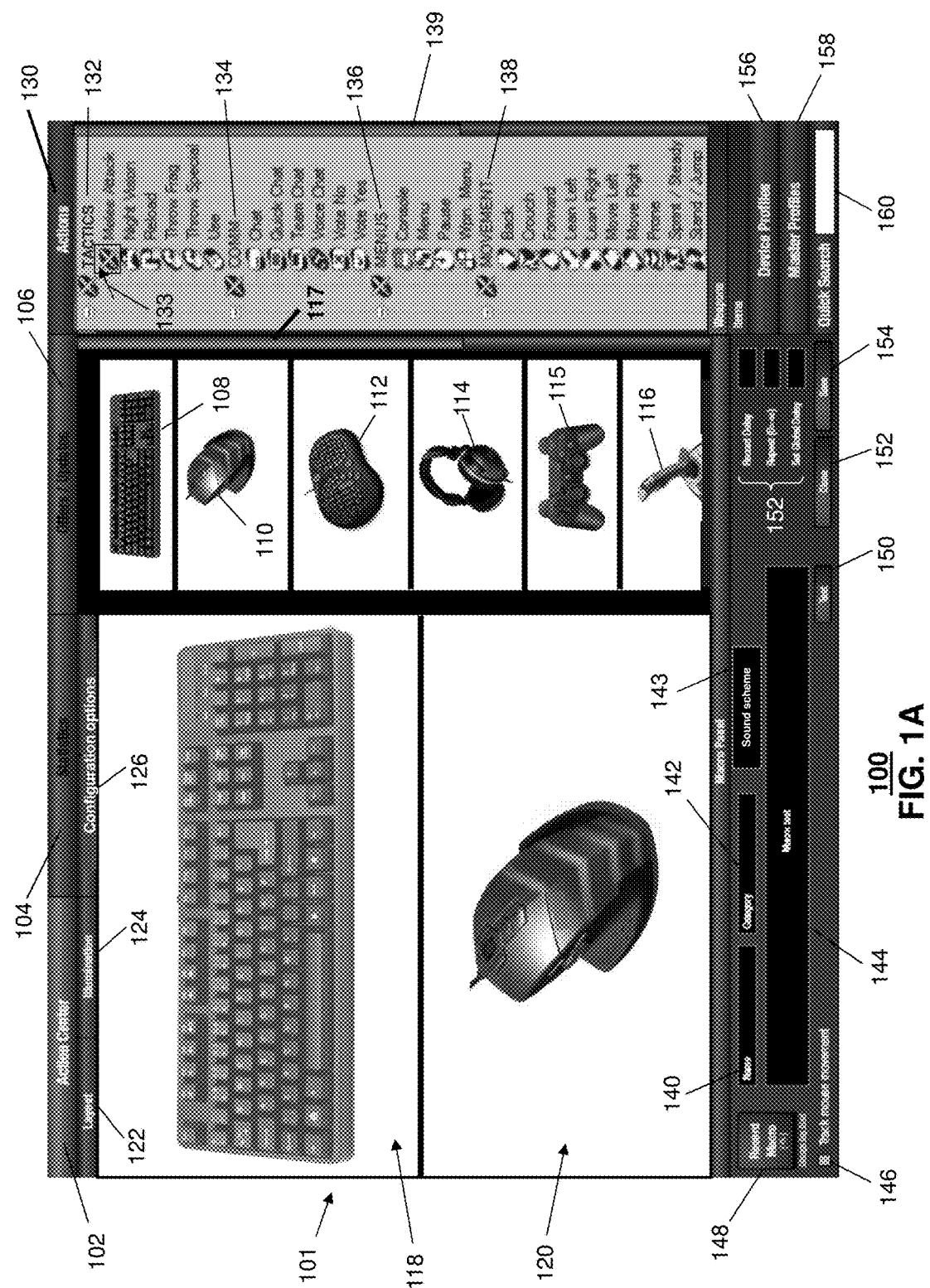

Once the associations have been recorded in the profile, the AMS application can proceed to step 432 to determine if the user desires to apply a sound selection and adjustment scheme to be applied to a particular gaming application (such as World of Warcraft™). FIGS. 1B-1C provide illustrative embodiments of GUIs for applying a sound scheme to a gaming application. Step 432 can be invoked by selecting GUI button 143 of FIG. 1A with a mouse pointer.

Suppose that the AMS application has presented the Actions portion 130 of FIG. 1A based on the user identifying the gaming application World of Warcraft. By knowing the gaming application from which Actions 130 are being associated to accessories, the AMS application can proceed to step 434 where it can retrieve from a library (e.g., common database) adjustable sounds which it can present a user in GUI 180 shown in FIG. 1B. The AMS application can be equipped with a library containing information relating to sounds produced by a plurality of gaming applications.

The supplier of the AMS application can sample sounds from several gaming applications using common sampling techniques, and thereby build a library that can be supplied to users with the AMS application. The supplier of the AMS application can also provide on-line updates to the library to provide users enhanced services. The information contained in the library can include without limitation a descriptor of gaming sounds (e.g., footsteps, weapon reload, ammunition sounds: various missile types, bullets types, etc.), pre-recorded sounds, frequency spectrum analysis of said sounds, and so on. In sum, the library used by the AMS application can include any suitable information for describing sounds generated by a gaming application. The AMS application can use this information in conjunction with common signal processing techniques to detect sounds generated by a gaming application, and in some instances, process said sounds in a manner desirable to the user to produce an adjusted gaming sound.

GUI 180 of FIG. 1B can provide a user a listing of adjustable sounds which can be selected with common checkbox GUI elements. Once a user selects the OK button of GUI 180, the AMS application can replace GUI 180 with GUI 190 of FIG. 1C. GUI 190 can provide the user a means to augment or reduce the sound energy of particular gaming sounds produced by a gaming application. A user can nearly eliminate a particular gaming sound (e.g., ambient sound) or increase the audio energy of a select sound type above a default audio standard generated by the gaming application. In the illustration of FIG. 1C, the less bars shown the less audio energy generated by the AMS application for a particular sound, and vice-versa.

A user can easily adjust audio energy by selecting a particular sound category using a mouse pointer (e.g., footsteps). Once a sound category is selected (noticeable by the AMS application highlighting the category) the user can increase or decrease the audio bars by depressing keyboard keys (e.g., up arrow or "+" key for more energy, down arrow or "−" key for less energy). Once the user has made adjustments to the selected sound types, the user can select the OK button which then invokes step 436 which records the sound selections and adjustments. The recorded selections and adjustments for a particular gaming application can be in turn stored in the profile selected at step 412, or created in step 428.

The steps of method 400 in whole or in part can be repeated until a desirable sound scheme and pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard from an unknown vendor by way of a communicative coupling to a computing device from which the AMS application operates. The AMS application in this instance can receive an identity from the keyboard or the operating system which is not known the AMS application. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to the keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device.

Figure 7:
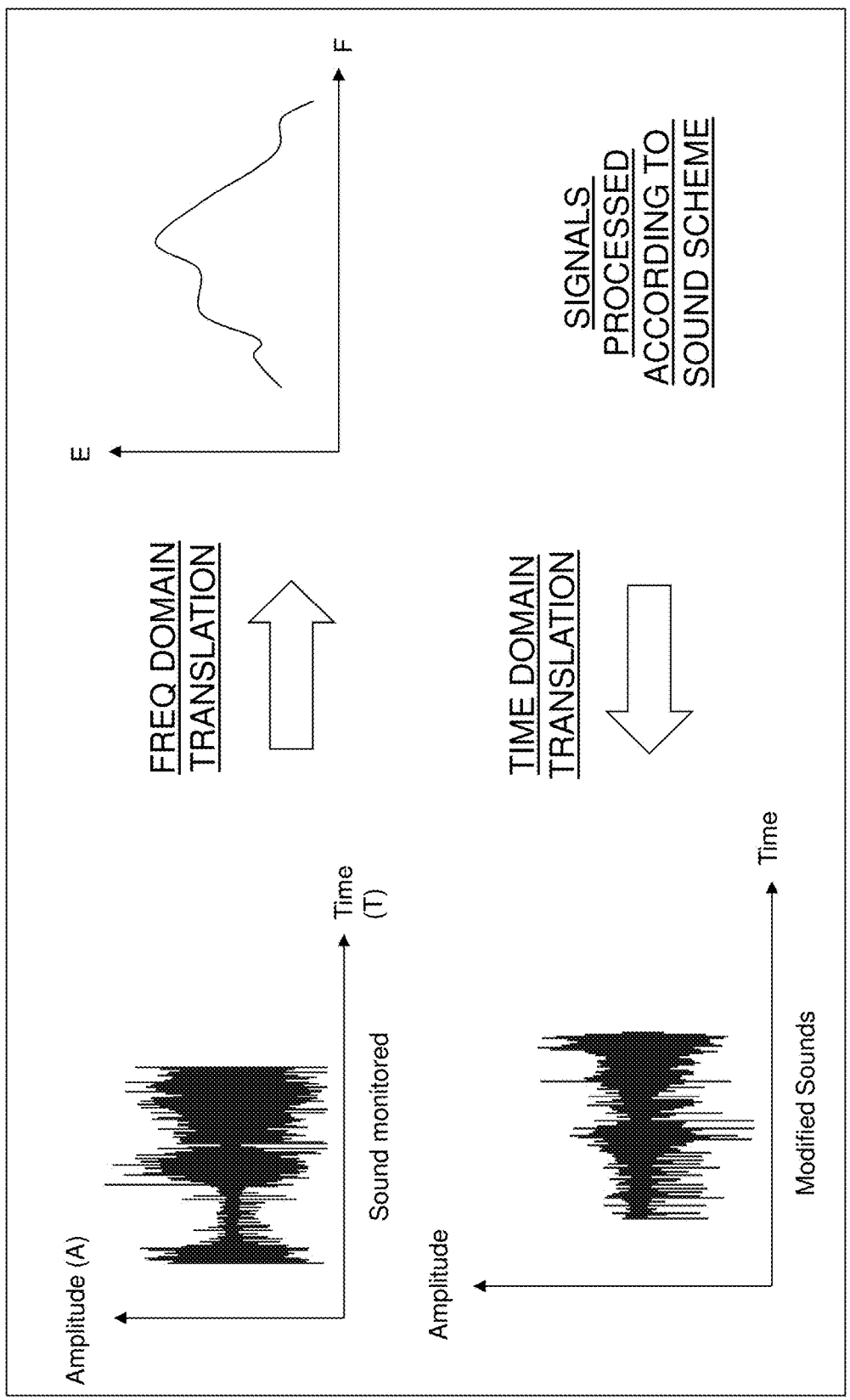
FIG. 7 depicts an illustrative embodiment for detecting sounds according to the method of FIG. 6.

FIG. 6 depicts a method 600 for illustrating the AMS application while a user is utilizing a gaming application. Method 600 can begin with step 601 in which the AMS application monitors sounds generated by a gaming application and adjusts sounds according to sound selections and adjustments recorded in step 436. Step 436 can be implemented by the AMS application utilizing common sound detection and sound processing techniques. The AMS application can retrieve frequency spectral profiles of the selected sounds from the library referred to in step 434. The AMS application can monitor sounds generated by the gaming application and search for possible matches utilizing common digital signal processing techniques. For example, the AMS application can digitally sample sound, and translate time domain signals to frequency domain signals for processing purposes utilizing a Fourier transform. By translating between domains, applying common filtering and spectral profile comparison techniques, the AMS application can detect selective sounds such as footsteps, weapon reload, and so on—see illustration of FIG. 7.

Once the AMS application detects a sound of interest (e.g., weapon reload) it can augment or reduce the audio energy in accordance with the settings applied by the user illustrated in FIG. 1C. In order for the user to hear the sound scheme s/he has chosen, the AMS application can substitute the original sound generated by the gaming application with portions of the original sounds adjusted according to the settings defined in FIG. 1C. A user will thus hear footsteps louder such as, for example, a 20% increase over the standard sound energy generated by the gaming application for footsteps. The user will also hear weapon reload actions much louder such as, for example, a 35% increase over the standard audio setting used by the gaming application for weapon reload actions. In comparison, ambient sound will be nearly suppressed (e.g., 98% of sound energy removed by the AMS application).

Thus in step 601 the AMS application can detect select gaming sounds generated by the gaming application, modify the audio energy of the detected sounds, and generate adjusted audio which can be presented to a user by way of common audio resources (e.g., speakers, or headphone) coupled to a computing device from which the AMS application operates.

The AMS application can be further programmed to detect in step 602 tactical conditions from the original sound generated by the gaming application or modified sound generated by the AMS application. A tactical condition can represent for example a weapon reload, drawing a weapon, or some other suitable tactical condition that can be of interest to a gamer. Although not shown in FIGS. 1A-1C, the AMS application can be programmed to present the user selectable options for defensive or offensive maneuvers which can be invoked automatically when the AMS application detects select gaming sounds generated by a gaming application.

For example, when the AMS application detects in step 602 the sound of a player drawing a weapon, the AMS application can be programmed to generate in step 603 a defensive maneuver (e.g., cause the player to drop to the ground to avoid being shot). The AMS application can be programmed to automatically submit a stimulus (or stimuli) to the gaming application to invoke such action when particular sounds are detected. The defensive maneuver can be invoked by the AMS application independent of the user causing the same action by manipulating an accessory such as a gaming controller, keyboard key selections, mouse button selections, or some other accessory input that would generate a stimulus (or stimuli) that would cause the player to drop to the ground. Automatic defensive or offensive maneuvers invoked by the detection of select sounds by the AMS application can provide a gamer a tactical advantage.

The AMS application can perform this function by way of an Application Programming Interface (API) of the gaming application. With a known API, the AMS application can monitor sound, and submit to the gaming application defensive or offensive maneuvers in the form of, for example, accessory stimuli to direct the actions of a particular player.

Steps 601-603 as described above can operate independently of the operations of steps 604-626 which implement the accessory association described earlier in method 400.

Turning attention to step 604, this step can represent monitoring of the stimulation of input functions of one or more accessories communicatively coupled to a computing device from which the AMS application operates. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. Other existing or future input functions of an accessory detectable by the AMS application is contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 608 where it retrieves the stimulation definition of these actions for each accessory reporting a stimulation. In step 610, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 610, the AMS application would substitute "Ctrl A" for stimulations consisting of the mouse clicks, navigation and a request for an IM application. The substitute stimulations would then be reported in step 612 to an operating system (OS).

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft) awaiting stimulation data from the computer system. In this illustration, the macro comprises both stimulation feedback for the active software application and a request to initiate an IM session. Accordingly, the OS conveys in step 618 the mouse stimulation signals to the active software application (e.g., gaming application), and in a near simultaneous fashion invokes the IM session in step 620 with a specific individual (or organization).

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on the depressions of "Ctrl A" has no particular association to an action. In this case, the AMS application passes this stimulation to the OS with no substitutes. In step 616 the OS can determine if this stimulation invokes a new software application in step 620 or is conveyed to the previously initiated software application.

Contemporaneous to the embodiments described above, the AMS application can also record in step 622 statistics relating to the detected accessory stimulations. A portion of the AMS application can operate as a background process which performs statistical analysis on the stimulations detected. By selecting button 104 in FIG. 1, the AMS application can provide an updated GUI which illustrates the usage of input functions of one or more accessories for which stimulations were detected in step 604. For ease of illustration, only a keyboard accessory is shown. In this illustration, certain keys (references 204, 206 208, 210) on the keyboard are color-coded to illustrate the frequency of usage of these keys.

A color scale 203 defines the frequency of usage of the input functions of the keyboard. The color scale 203 should not be confused with the color scales of FIGS. 1B-1C. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 208 depict a color coding with the highest detectable usage, while the F7 key (reference 210) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics from a given session.

The GUI of FIG. 2 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 2.

In addition to a symbolic representation as shown in FIG. 2, the AMS application can provide the user a means to visualize raw statistics in a table format such as shown in FIG. 3 by selecting button 212. The table format shows raw data in section 302 and possible suggestions in section 304 for improving user performance which can be generated by the AMS application in step 626. Section 302 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt.> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt.> and <Ctrl A> which can be assigned to keys on the keyboard or left and right buttons of a mouse. The latter suggestion of assigning macros to the mouse can help the user free up his/her left hand.

Although not shown in section 304, the AMS application can also be programmed to suggest alternative options for the color scales chosen in FIGS. 1B-1C. The AMS application can for example detect that the most frequently used keys may lead the user to visualize a color scale better if it were move to another location of the accessory. For example, the color scale of the mouse 110 may be hidden by the user's hand. Accordingly, the AMS application may recommend that the color scale for enemy proximity be move to another accessory such as the keyboard 108 in an area with minimal use (e.g., the keys above the arrows—Delete, Insert, Page Up/Down, and Home, End, etc.).

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIG. 1), an understanding of the associations made by other users (e.g., gamers) to improve their performance when controlling the software, and so on. The AMS application can also be adapted to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, method 400 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory.

The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 14 layer 24 layer 34 to layer 14 and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, etc.

In another embodiment, method 400 can be adapted so that a user can define super macros and/or super profiles. A super macro can represent nested macros (combinations of macros). Method 400 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

A super profile can also comprise sub-profiles, each sub-profile defining a sound scheme for a sub-function of a particular gaming application. A sub-function can represent for example a selection of an avatar from a list of possible avatars in the gaming application. For instance a user of the AMS application can associate a warrior avatar with a desirable sound scheme which can be stored in a sub-profile. The user can in the same instance associate a different sound scheme for a military avatar and store this association in a different sub-profile. Both sub-profiles can then be stored by the AMS application in one super-profile which is associated with the gaming application from which the warrior avatar or military avatar is generated.

The user can then select the sub-profile prior to initiating the gaming application. Responsive to this selection, the AMS application can invoke the sound scheme for the selected sub-profile. Alternatively, when the user selects the warrior avatar or the military avatar while the gaming application is in operation, the AMS application can detect the selection by way of an API of the gaming application and automatically select the sub-profile according to the detected avatar selection.

In yet another embodiment, method 400 can be adapted to establish audio profiles for headset accessories. When a user selects a headset accessory such as 114, the AMS application can be adapted to automatically generate GUIs 180 and 190, respectively, to establish a sound scheme defined by the user as described earlier in steps 434 and 436. Hence, the steps of method 400 can be reordered or modified in any fashion that may be suitable for establishing associations and/or sound schemes per gaming application.

In another embodiment, at least one of methods 400-600 can be adapted to operate as an integral part of the gaming application. Accordingly, once actions have been associated with accessories and sound schemes are defined, such settings can be integral to the gaming application. Method 600 can then be applied by the gaming application to provide results similar to those described above.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

Figure 8:
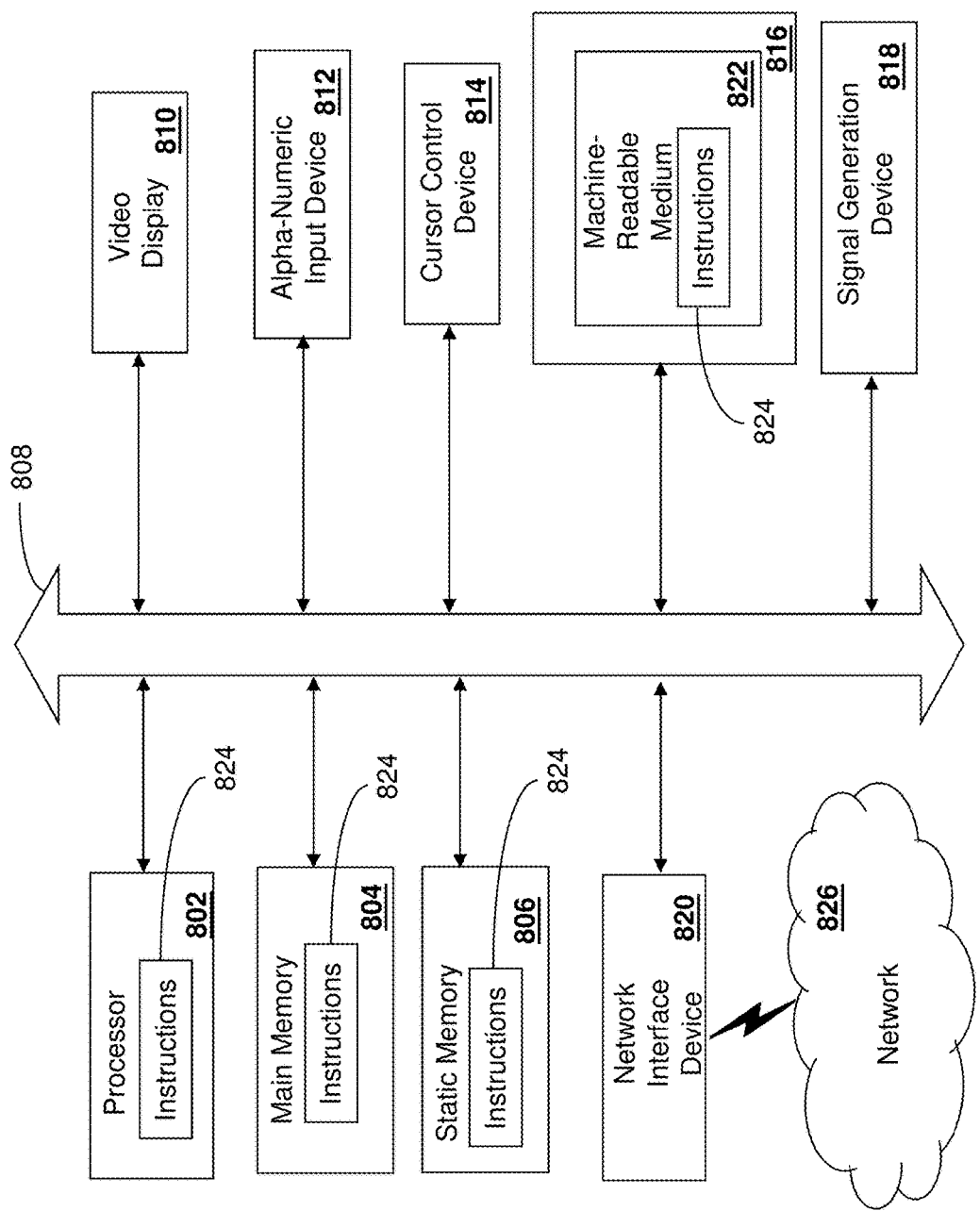
FIG. 8 depicts an illustrative diagrammatic representation of a machine in the form of a computer system within which a set of instructions, when executed, may cause the machine to perform any one or more of the methodologies disclosed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage device, comprising executable instructions, which when executed by a processing system including a processor, cause the processor to perform operations comprising:
   receiving a selection of a gaming application from a plurality of gaming applications to generate a selected gaming application;
   presenting a plurality of adjustable categories of sounds associated with the selected gaming application;
   receiving a selection of a first particular category of sound of the plurality of adjustable categories of sounds to generate a first selected category of sound;
   receiving a first request to modify the first selected category of sound to generate a modified sound during gameplay of the selected gaming application;
   generating the modified sound to enhance audio perception of the first selected category of sound during the gameplay of the selected gaming application; and
   receiving a second request to associate a second selected category of sound of the gameplay of the selected gaming application with a command by the selected gaming application when a second particular category of sound of the plurality of adjustable categories of sounds is detected during the gameplay, wherein the first selected category of sound and the second category of sound are a same category of sound.

2. The non-transitory, machine-readable storage device of claim 1, wherein the operations further comprise:
   presenting, on a graphical user interface, a selectable option for selecting the command to be associated with the selected gaming application for the second selected category of sound when the second selected category of sound is detected during the gameplay; and
   receiving a selected command to invoke when the second selected category of sound is detected during the gameplay.

3. The non-transitory, machine-readable storage device of claim 1, wherein the operations further comprise:
   detecting, during the gameplay of the selected gaming application, a sample of audio produced by the selected gaming application to generate a detected audio sample;
   analyzing the detected audio sample to determine a first spectral profile of the detected audio sample; and
   comparing the first spectral profile of the detected audio sample to a second spectral profile that is associated with the first selected category of sound to determine if the detected audio sample corresponds to the second selected category of sound.

4. The non-transitory, machine-readable storage device of claim 3, wherein the first spectral profile of the detected audio sample is determined by transforming a time domain signal that is associated with the detected audio sample to a frequency domain signal.

5. The non-transitory, machine-readable storage device of claim 1, wherein the command includes one of a defensive maneuver or an offensive maneuver for the selected gaming application.

6. The non-transitory, machine-readable storage device of claim 1, wherein the non-transitory, machine-readable storage device operates in a gaming console or a computer, and wherein the selected gaming application operates from the gaming console, the computer, or a remote computing device.

7. The non-transitory, machine-readable storage device of claim 1, wherein the first selected category of sound and the second selected category of sound are selected from sounds including one of a sound of footsteps, a sound of reloading a weapon, a sound of drawing a weapon, and a sound of utilizing ammunition.

8. A gaming console, comprising:
a processing system including a processor; and
a memory that stores executable instructions that, when executed by the processing system, facilitate performance of operations, comprising:
presenting a plurality of adjustable categories of sounds associated with a gaming application;
obtaining a selection of a particular category of sound of the plurality of adjustable categories of sounds to generate a selected category of sound;
modifying the selected category of sound to generate a modified sound to enhance audio perception of the selected category of sound during gameplay of the gaming application;
generating the modified sound of the selected category of sound during the gameplay of the gaming application; and
receiving a second selection to associate the selected category of sound with a command by the gaming application when the selected category of sound is detected during the gameplay.

9. The gaming console of claim 8, wherein the operations further comprise performing the command when the selected category of sound is detected during the gameplay.

10. The gaming console of claim 8, wherein the operations further comprise:
detecting, during the gameplay of the gaming application, a sample of audio produced by the gaming application to generate a detected audio sample;
analyzing the detected audio sample to determine a first spectral profile of the detected audio sample; and
comparing the first spectral profile of the detected audio sample to a second spectral profile that is associated with the selected category of sound to determine if the detected audio sample corresponds to the selected category of sound.

11. The gaming console of claim 10, wherein the first spectral profile of the detected audio sample is determined by transforming a time domain signal that is associated with the detected audio sample to a frequency domain signal.

12. The gaming console of claim 10, wherein the selected category of sound is selected from sounds from the gameplay including one of a sound of footsteps, a sound of reloading a weapon, a sound of drawing a weapon, and a sound of utilizing ammunition.

13. The gaming console of claim 8, wherein the command comprises implementing a defensive maneuver or an offensive maneuver responsive to detecting a sample of audio associated with the selected category of sound.

14. A method, comprising:
receiving, by a processing system including a processor, a first selection of a particular category of sound of a plurality of adjustable categories of sounds of a gaming application to generate a first selected category of sound;
adjusting, by the processing system, the first selected category of sound to generate an adjusted sound to enhance audio perception of the first selected category of sound during gameplay of the gaming application;
generating, by the processing system, the adjusted sound during the gameplay of the gaming application;
receiving, by the processing system, a second selection of a second selected category of sound of the plurality of adjustable categories of sounds of the gaming application to generate the second selected category of sound, wherein the first selected category of sound and the second category of sound are a same category of sound; and
receiving a third selection of a command to perform when the second selected category of sound is detected from the gaming application.

15. The method of claim 14, further comprising obtaining, by the processing system, a selected defensive maneuver or an offensive maneuver to invoke when the second selected category of sound is detected during the gameplay.

16. The method of claim 14, further comprising:
identifying, by the processing system, during the gameplay of the gaming application, a sample of audio produced by the gaming application to generate a detected audio sample;
analyzing, by the processing system, the detected audio sample to determine a first spectral profile of the detected audio sample; and
comparing, by the processing system, the first spectral profile of the detected audio sample to a second spectral profile that is associated with the first selected category of sound to determine if the detected audio sample corresponds to the first selected category of sound.

17. The method of claim 16, wherein the first spectral profile of the detected audio sample is determined by transforming a time domain signal that is associated with the detected audio sample to a frequency domain signal.

18. The method of claim 14, further comprising performing, by the processing system, a tactical action responsive to detecting a sample of audio associated with the first selected category of sound.

19. The method of claim 14, wherein the second selected category of sound represents an action of the gaming application, and wherein the command is performed in response to the action of the gaming application.

20. The method of claim 19, wherein the command comprises a selected tactical action including a movement, a crouch, a melee attack, an offensive maneuver, or a defensive maneuver.

* * * * *